Dec. 21, 1943.  A. FEROY  2,337,090
PISTON COOLING MEANS FOR INTERNAL COMBUSTION ENGINES
Filed Oct. 29, 1942
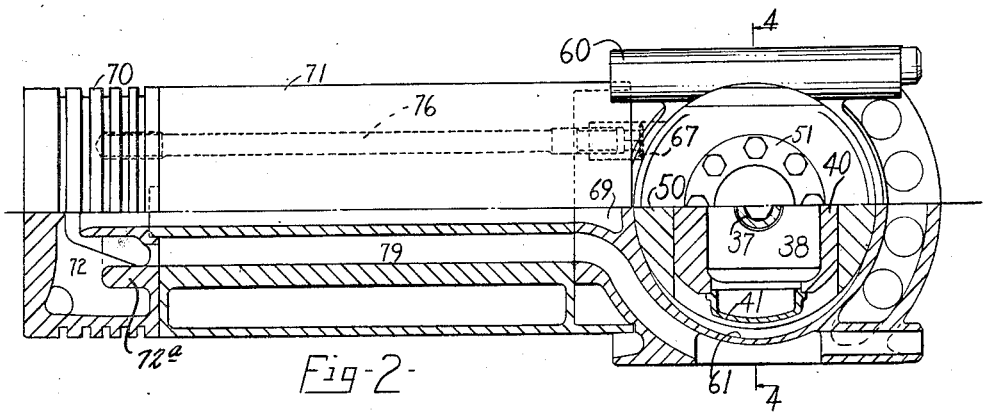
Fig-2-
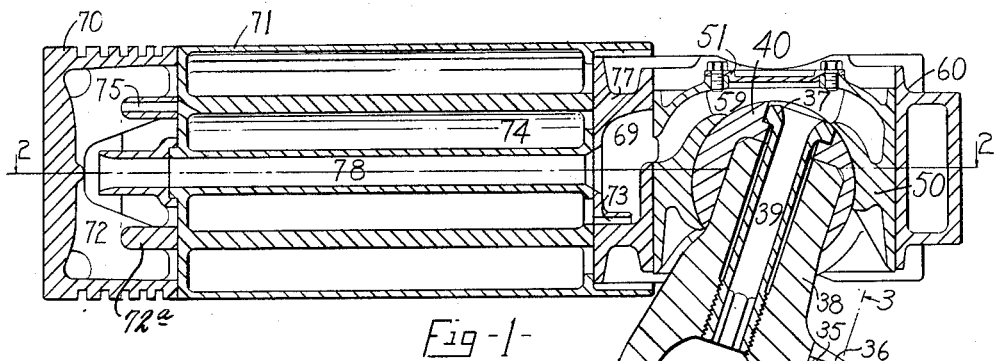
Fig-1-
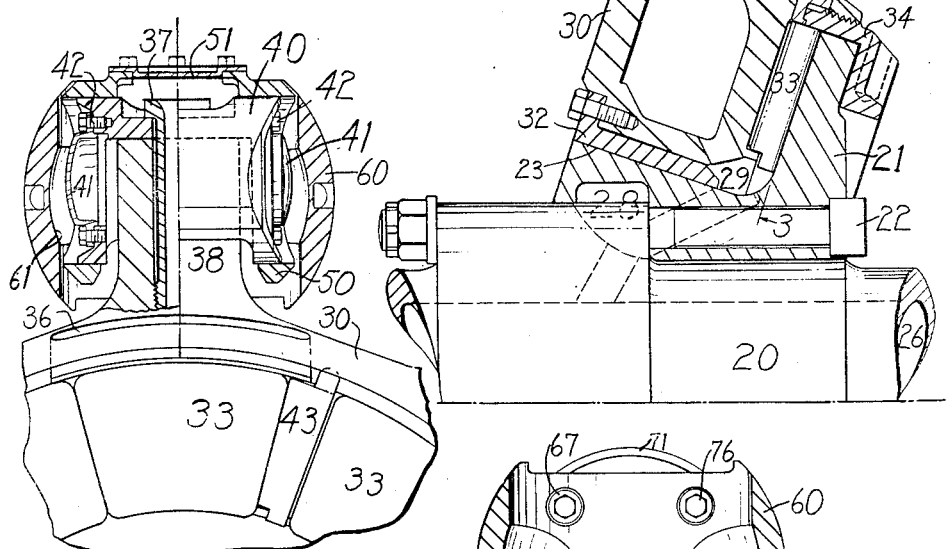
Fig-3-
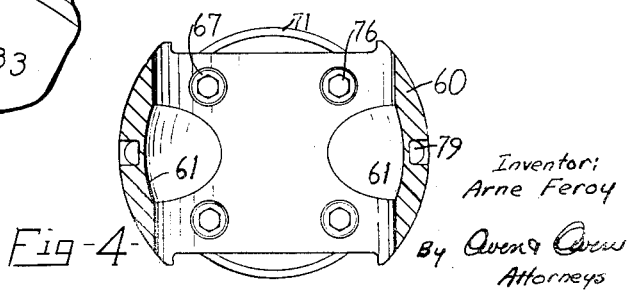
Fig-4-
Inventor:
Arne Feroy
By Owen & Owen
Attorneys Patented Dec. 21, 1943

2,337,090

UNITED STATES PATENT OFFICE 2,337,090

PISTON COOLING MEANS FOR INTERNAL COMBUSTION ENGINES

Arne Feroy, Hamilton, Ohio, assignor to General Machinery Corporation, Hamilton, Ohio, a corporation of Delaware Application October 29, 1942, Serial No. 463,848

2 Claims. (Cl. 123—176)

This invention relates to piston cooling means for internal combustion engines and is particularly directed to means to cool the pistons in engines of the class commonly called barrel, axial, or round engines, in which pistons reciprocate parallel to the crank shaft. This application constitutes a division of my co-pending application, Serial No. 437,160, filed April 1, 1942, entitled "Mechanism for the interconversion of reciprocation and rotation."

The primary object of the invention is the provision of means to cool the piston of an internal combustion engine by utilizing the motion of the piston to circulate cooling fluid therein.

Another object of the invention is to provide a piston structure in which the interior is divided into chambers, each of which is vented and each of which has an inlet port for cooling liquid whereby circulation of liquid through the piston takes place upon reciprocation thereof.

Other objects and advantages of the invention will become apparent from the following specification taken in connection with the accompanying drawing in which:

Figure 1 is a longitudinal section of a portion of a rocker mechanism; Fig. 2 is a top or radial view, partly in section, taken on line 2—2 of Fig. 1; Fig. 3 is a transverse view, partly in section, taken on line 3—3 of Fig. 1, and Fig. 4 is a transverse section of the crosshead only, taken on line 4—4 of Fig. 2.

Referring to the drawing, the invention is shown embodied in an engine comprising a shaft 20 which is mounted in bearings of the fixed part of the machine as usual, although the fixed parts, not being involved in the invention, are not shown. The interior of the shaft 20 is made hollow to form a chamber 26. A swashplate 21 is fixed to the shaft 20 by bolts 22 and a rocker 30 is mounted on a journal bearing 32 carried over a journal surface 23. The axial thrust on rocker 30 is taken by slipper bearings 33 carried between a plane surface of the rocker 30 and a plane face of the swashplate 21. The slippers 33 are prevented from sliding relative to rocker 30 by a stop 43. A keeper ring 34 is attached to the rocker 30 and co-acts with the face of the swashplate opposite the slipper bearings to prevent axial movement of the rocker away from the swashplate. The ring 34 also holds a block 35 in place, which block fills an access hole 36 in the rocker 30 through which the slippers 33 can be removed. The slippers 33 and journal surface 23 are lubricated by oil passing from chamber 26 in the shaft 20 through a chamber 55 28 and a passage 29 in the corner of the swashplate 30.

The upper end of the rocker is formed as an arm 38 which is faced off with two parallel plane faces and which is essentially rectangular in cross section. A hollow wrist pin 40 is provided to fit over the end of arm 38 and is clamped securely thereto by a hollow screw 37, the interior of which forms an oil passage 39. The ends of the wrist pin are covered by spherical caps 41 held in place by screws 42.

The wrist pin 40 is operable in a cylindrical bore through a pinhead 50 which latter operates in another cylindrical bore in a crosshead 60, the bores having axes normal to each other. The pinhead 50 is substantially solid except for a chamber 59 formed therein and closed by a pinhead cover 51. The chamber 59 communicates with the interior 39 of the hollow screw 37 and, as hereinafter described, with the interior of the piston.

The crosshead 60 is bolted to a piston head 70 and the piston skirt 71 is clamped between them. Bolts 76 pass through holes in the bore in which the pinhead 50 operates and are drawn up by nuts 67 as shown in Figs. 2 and 4.

The interior of the crosshead 60 is formed with a chamber 69 in direct communication with chamber 59 formed in the pinhead. The chamber 69, in turn, is in direct communication with a passage 78 which extends longitudinally of the piston and terminates in the hollow interior 72 of the piston 70. The interior 72 is vented to the outside through a passage 75 formed in an annular boss 72ª inside the piston, through a passage 74 in the extension of the piston and through a passage 77 in the crosshead, which passage communicates with the atmosphere. The chamber 74 is, of course, annular and at its upper end communicates with the outside as previously noted and at its lower end communicates with chamber 69 through a small passage 73. The passage 73 thus constitutes a vent for chamber 69.

As shown in Fig. 2, an additional passage 79 extends through the piston to communicate with the interior 72 of the head portion thereof at the base inside the annular boss 72ª. The passage extends around the crosshead into the rocker casing where it may communicate with the conventional reservoir and pump, so that oil returning from the piston head may be recirculated.

In operation, oil is fed under pressure into the interior 26 of the shaft 20 and from this into annular chamber 28 through clearance space 29 and into one corner of the swashplate 21 from which it can lubricate both the bearing surface 23 and the slippers 33. Passing into the interior of the rocker 30, the oil flows outwardly through the interior 39 of the hollow screws 37 into each chamber 59, thence into chamber 69 in the crosshead 60. On an "outward" movement of the piston the inertia forces tend to throw oil from the chamber 69 through passage 78 into the hollow interior 72 of the head of the pistons. The air thus displaced by the inrushing oil is vented through vent passage 75, the annular passage 74, and vent 77, and chamber 69 is vented through passages 73, 74 and 77. Upon a return movement of the piston the oil accumulated in the interior 72 may pass out through passages 79 and back into the reservoir, any venting, if necessary, taking place by reversal of flow in the vent passage. In this way, a positive circulation of cooling oil is insured in the head of piston 70 without building up excessive pressures from inertia forces on a long column of oil and without difficulty of a "water hammer."

It will be appreciated that oil is thus continually circulated to the head of the piston and that the quantity thereof can be varied by changing the size of the respective passages involved.

While the invention has been described in connection with a specific type of engine as shown in my aforesaid parent application, Serial No. 437,160, it will be appreciated that it is equally applicable to engines of other types with slight modifications and changes. It should be understood that such modifications and changes may be made without departing from the spirit of the invention as defined in the appended claims.

What I claim as new and desire to secure by United States Letters Patent is:

1. In an engine mechanism, reciprocating members each comprising a piston portion and a crosshead portion, means for circulating cooling oil from said crosshead portion to and from said piston portion, and including a chamber in said crosshead portion, a chamber in said piston portion, a passage connecting said chambers, an outlet passage from said piston chamber, and an air vent into each of said chambers.

2. In mechanism of the class described, a shaft, reciprocating members operable parallel to said shaft and each comprising a piston portion and a crosshead portion, mechanism operably connecting said reciprocating members with said shaft, and means for circulating cooling oil from within said shaft to and from said piston portion, said means including passages thru said mechanism, a chamber in said crosshead portion, a chamber in said piston portion, a passage connecting said chambers, an outlet passage from said piston chamber, and an air vent in each of said chambers.

ARNE FEROY.